United States Patent
Krishnan et al.

(10) Patent No.: US 10,862,739 B2
(45) Date of Patent: *Dec. 8, 2020

(54) SYSTEMS AND METHODS FOR DYNAMIC OUTPUT CONTROL HIERARCHY FOR WIRELESS FIRE SYSTEMS AND FOR FIRE PROTECTION BEFORE AND DURING THE INSTALLATION THEREOF

(71) Applicant: Honeywell International Inc., Morris Plains, NJ (US)

(72) Inventors: Lalu Krishnan, Bangalore (IN);
Abhilash Damodaran, Bangalore (IN);
Vipindas E K, Bangalore (IN);
Vignesh Mohan, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,849

(22) Filed: Nov. 27, 2019

(65) Prior Publication Data
US 2020/0099574 A1    Mar. 26, 2020

Related U.S. Application Data

(63) Continuation of application No. 16/413,321, filed on May 15, 2019, now Pat. No. 10,523,497, which is a (Continued)

(51) Int. Cl.
*H04L 12/24*    (2006.01)
*H04L 29/08*    (2006.01)
(Continued)

(52) U.S. Cl.
CPC ......... *H04L 41/0654* (2013.01); *G08B 17/10* (2013.01); *G08B 25/08* (2013.01);
(Continued)

(58) Field of Classification Search
CPC ..... H04L 41/0654; H04L 41/12; H04L 45/28; H04L 67/125; H04L 65/102; G08B 17/10;
(Continued)

(56) References Cited

U.S. PATENT DOCUMENTS 6,567,001 B1    5/2003  Barrieau et al.
6,624,750 B1    9/2003  Marman et al.
(Continued)

FOREIGN PATENT DOCUMENTS

CN    101159719    4/2008
CN    102542746 A  7/2012
(Continued)

OTHER PUBLICATIONS

English language translation of abstract and bibliographic information for RU2399095C1.
(Continued)

*Primary Examiner* — Hirdepal Singh
(74) *Attorney, Agent, or Firm* — Brooks, Cameron & Huebsch, PLLC

(57) ABSTRACT

Systems and methods for dynamic output control hierarchy for wireless fire systems and for fire protection before and during the installation thereof are provided. Systems can include a fire system control panel, a gateway device coupled to the control panel, and a mesh network coupled to the gateway device. Responsive to the gateway device detecting a loss of communication with the control panel or a failure of the control panel, the gateway device can control activation of output devices in the mesh network. Responsive to a first device in the mesh network detecting a failure of the gateway device, the first device can control activation of the output devices in the mesh network. In some embodiments, the first device can control activation of the output devices of a second device in the mesh network, and in some
(Continued)

embodiments, the first device can self-control activation of its own output devices.

19 Claims, 4 Drawing Sheets

Related U.S. Application Data continuation of application No. 15/417,620, filed on Jan. 27, 2017, now Pat. No. 10,298,443.

(51) Int. Cl.

| | | |
|---|---|---|
| *G08B 17/10* | (2006.01) | |
| *G08B 25/08* | (2006.01) | |
| *G08B 25/10* | (2006.01) | |
| *G08B 25/14* | (2006.01) | |
| *G08B 29/06* | (2006.01) | |
| *G08B 29/16* | (2006.01) | |
| *G08B 29/18* | (2006.01) | |
| *H04L 12/703* | (2013.01) | |
| *H04L 29/06* | (2006.01) | |
| *H04W 40/24* | (2009.01) | |
| *H04W 84/18* | (2009.01) | |

(52) U.S. Cl.
CPC ............ *G08B 25/10* (2013.01); *G08B 25/14* (2013.01); *G08B 29/06* (2013.01); *G08B 29/16* (2013.01); *G08B 29/18* (2013.01); *H04L 41/12* (2013.01); *H04L 45/28* (2013.01); *H04L 65/102* (2013.01); *H04L 67/125* (2013.01); *H04W 40/24* (2013.01); *H04W 84/18* (2013.01)

(58) Field of Classification Search
CPC ........ G08B 25/08; G08B 25/14; G08B 29/18; G08B 29/06; G08B 29/16; G08B 25/10; H04W 84/18; H04W 40/24
USPC .......................................................... 370/338
See application file for complete search history.

(56) References Cited

U.S. PATENT DOCUMENTS

| | | | |
|---|---|---|---|
| 7,860,495 B2 | 12/2010 | McFarland | |
| 8,339,991 B2 | 12/2012 | Biswas et al. | |
| 9,489,814 B1 | 11/2016 | Pettigrew et al. | |
| 9,668,196 B2* | 5/2017 | Courtice | H04W 40/246 |
| 9,965,944 B1 | 5/2018 | Zwim et al. | |
| 2005/0174229 A1* | 8/2005 | Feldkamp | G08B 13/19695 340/506 |
| 2009/0154343 A1 | 6/2009 | Fitch et al. | |
| 2010/0150122 A1 | 6/2010 | Berger et al. | |
| 2010/0238018 A1 | 9/2010 | Kelly | |
| 2012/0134257 A1 | 5/2012 | Knox | |
| 2012/0163352 A1 | 6/2012 | Bansal et al. | |
| 2013/0082838 A1 | 4/2013 | Watts | |
| 2013/0343202 A1 | 12/2013 | Huseth et al. | |
| 2015/0163002 A1* | 6/2015 | Frison | H04L 67/12 370/220 |
| 2015/0163758 A1 | 6/2015 | Frison et al. | |
| 2015/0288604 A1* | 10/2015 | Boudreaux | G08B 13/19697 370/328 |
| 2016/0050264 A1 | 2/2016 | Breed et al. | |
| 2016/0226702 A1 | 8/2016 | Probin et al. | |
| 2017/0287319 A1* | 10/2017 | Moffa | G08B 29/145 |
| 2018/0061603 A1 | 3/2018 | Hendrixson et al. | |
| 2018/0122221 A1 | 5/2018 | Norton et al. | |
| 2018/0183653 A1 | 6/2018 | Chew et al. | |
| 2018/0365969 A1 | 12/2018 | Krein et al. | |
| 2019/0139397 A1 | 5/2019 | Ziems et al. | |

FOREIGN PATENT DOCUMENTS

| | | |
|---|---|---|
| CN | 104052787 A | 9/2014 |
| EP | 2884777 A1 | 6/2015 |
| EP | 3101951 A1 | 7/2016 |
| RU | 2399095 C1 | 9/2010 |

OTHER PUBLICATIONS

Extended European search report from corresponding EP patent application 17207851.1, dated Jun. 28, 2018.
Communication Pursuant to Article 94(3) EPC from related European Application No. 17207851, dated Dec. 19, 2019, 4 pages.
Communication Pursuant to Article 94(3) EPC from related European Application No. 17207851, dated May 15, 2020, 5 pages.
Office Action from related China Patent Application No. 20180078046.3, dated Jul. 24, 2020, 21 pages.

* cited by examiner

SYSTEMS AND METHODS FOR DYNAMIC OUTPUT CONTROL HIERARCHY FOR WIRELESS FIRE SYSTEMS AND FOR FIRE PROTECTION BEFORE AND DURING THE INSTALLATION THEREOF

PRIORITY INFORMATION

This application is a Continuation of U.S. application Ser. No. 16/413,321, filed May 15, 2019, which is a Continuation of U.S. application Ser. No. 15/417,620, filed Jan. 27, 2017, now U.S. Pat. No. 10,298,443, the contents of which are incorporated herein by reference.

FIELD

The present invention relates generally to wireless fire systems. More particularly, the present invention relates to systems and methods for dynamic output control hierarchy for wireless fire systems and for fire protection before and during the installation thereof.

BACKGROUND

In known wireless fire systems, fire protection is not possible before and during the installation and wiring of a fire system control panel, when the fire system control panel or a loop card fails, or when the wireless fire system or a gateway device thereof is jammed or fails.

In view of the above, there is a continuing, ongoing need for improved systems and methods.

DETAILED DESCRIPTION

Figure 1:
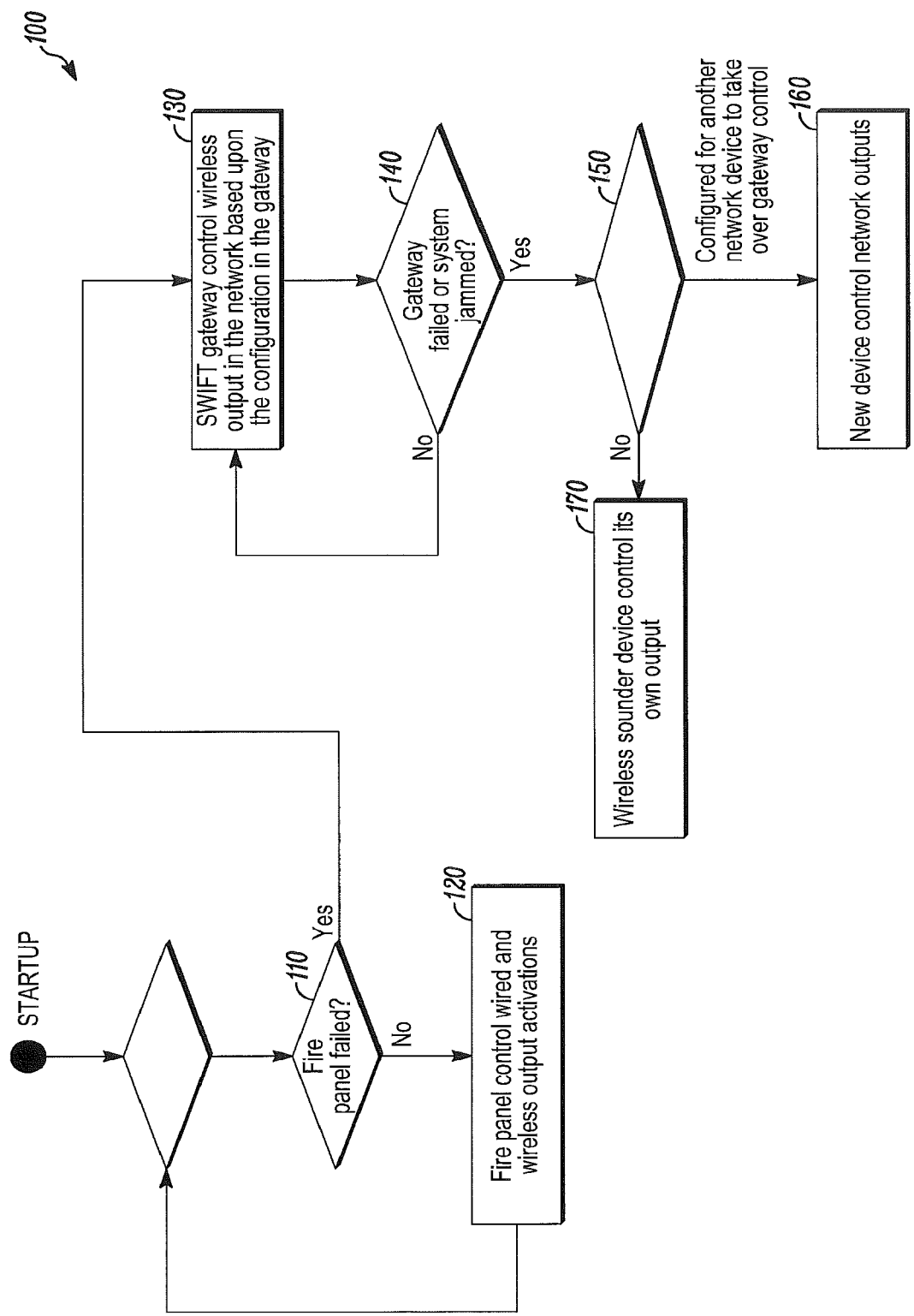
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for dynamic output control hierarchy for wireless fire systems and for fire protection before and during the installation thereof. For example, in some embodiments, dynamic output control hierarchy can be based upon the failure of components of the wireless fire system. Additionally or alternatively, in some embodiments, a hybrid device of the wireless fire system can be self-activated when predetermined conditions are detected, for example, when the hybrid device determines that the wireless fire system or a gateway device thereof is jammed. Additionally or alternatively, in some embodiments, systems and methods disclosed herein can provide fire protection and annunciation capabilities before and during the installation and wiring of a fire system control panel. Additionally or alternatively, in some embodiments, systems and methods disclosed herein can provide fire protection when a fire system control panel or a loop card fails. Additionally or alternatively, in some embodiments, systems and methods disclosed herein can provide fire protection when communication with an SLC controller fails.

In accordance with disclosed embodiments, a wireless fire system can include a fire system control panel, a gateway device, and a mesh network. In some embodiments, when the mesh network loses communication with the fire system control panel, the gateway device can control activation of its own output devices and output devices in the mesh network. Additionally or alternatively, when the gateway device fails, one of the wireless devices of the mesh network can act as a gateway device by controlling wireless output devices in the mesh network. Additionally or alternatively, when the gateway device fails, a hybrid device of the mesh network can control activation of its own output devices based on the activation of input devices attached to the hybrid device.

For example, a hybrid device that is part of a mesh network can be battery powered and can be an input and output device, such as, for example, a wireless sounder device. During normal operation, the hybrid device can operate under the control of the fire system control panel. However, when the hybrid device determines that the wireless fire system or the gateway device is jammed, the hybrid device can drop out of the mesh network and be self-controlled and self-activated based on ambient conditions, such as heat or smoke, detected by its input devices.

FIG. 1 is a flow diagram of a method 100 in accordance with disclosed embodiments. As seen in FIG. 1, the method 100 can include determining whether a fire system control panel has failed as in 110. When there is no fire system control panel failure, the method 100 can include the fire system control panel controlling and activating wired and wireless output devices in a fire system that are coupled thereto as in 120.

However, when the method 100 determines that the fire system control panel has failed as in 110, the method 100 can include a gateway device controlling and activating wireless output devices in a wireless fire system coupled thereto as in 130. Then, the method 100 can include determining whether the gateway device has failed or the wireless fire system is jammed as in 140. If not, then the gateway device can continue controlling and activating the wireless output devices in the wireless fire system as in 130.

However, when the method 100 determines that the gateway device has failed or the wireless fire system is jammed as in 140, the method 100 can determine whether another device in the wireless fire system is configured to take over for the gateway device as in 150. If so, then the method 100 can include the other device in the wireless fire system that is configured to take over for the gateway device controlling and activating the wireless output devices in the wireless fire system as in 160. However, when the method 100 determines that no other device in the wireless fire system is configured to take over for the gateway device as in 150, then the method 100 can include a device in the wireless fire system, such as, for example, a hybrid device or a sounder device, self-controlling and self-activating its own output devices as in 170.

In accordance with the above and a first example of embodiments disclosed herein, when a gateway device loses communication with a fire system control panel or when the fire system control panel fails, the gateway device can detect the communication loss or the control panel failure and, responsive thereto, begin controlling output devices in the mesh network coupled to the gateway device. For example, in some embodiments, the gateway device can be preconfigured with instructions stored in memory and activate some or all of the output devices in the mesh network based on those preconfigured instructions. Furthermore, in some embodiments, the gateway device can synchronize all of the output devices in the mesh network.

In accordance with the above and a second example of embodiments disclosed herein, when a gateway device fails, a battery powered hybrid device, such as, for example, a sounder device, can detect the gateway device failure and, responsive thereto, begin self-controlling and self-activating its own output devices based on ambient conditions, such as, for example, heat or smoke, detected by its own input devices.

In accordance with the above and a third example of embodiments disclosed herein, when a gateway device fails, another wireless device in a mesh network can detect the gateway device failure and, responsive thereto, begin controlling and activating other output devices in the mesh network.

As explained above, in some embodiments, systems and methods disclosed herein can provide fire protection and annunciation capabilities before and during the installation and wiring of a fire system control panel. For example, a hybrid device, such as, for example, a sounder device, can be installed outside of a fire system network and in locations that are prone to fire and can provide fire annunciation independently of any signals from or connection to a fire system control panel, for example, by providing fire annunciation responsive to ambient conditions, such as, for example, heat or smoke, detected by its own input devices. However, when the fire system control panel or a gateway device becomes available and coupled to the hybrid device, the hybrid device can receive control signals from the fire system control panel or the gateway device for fire annunciation.

Figure 2:
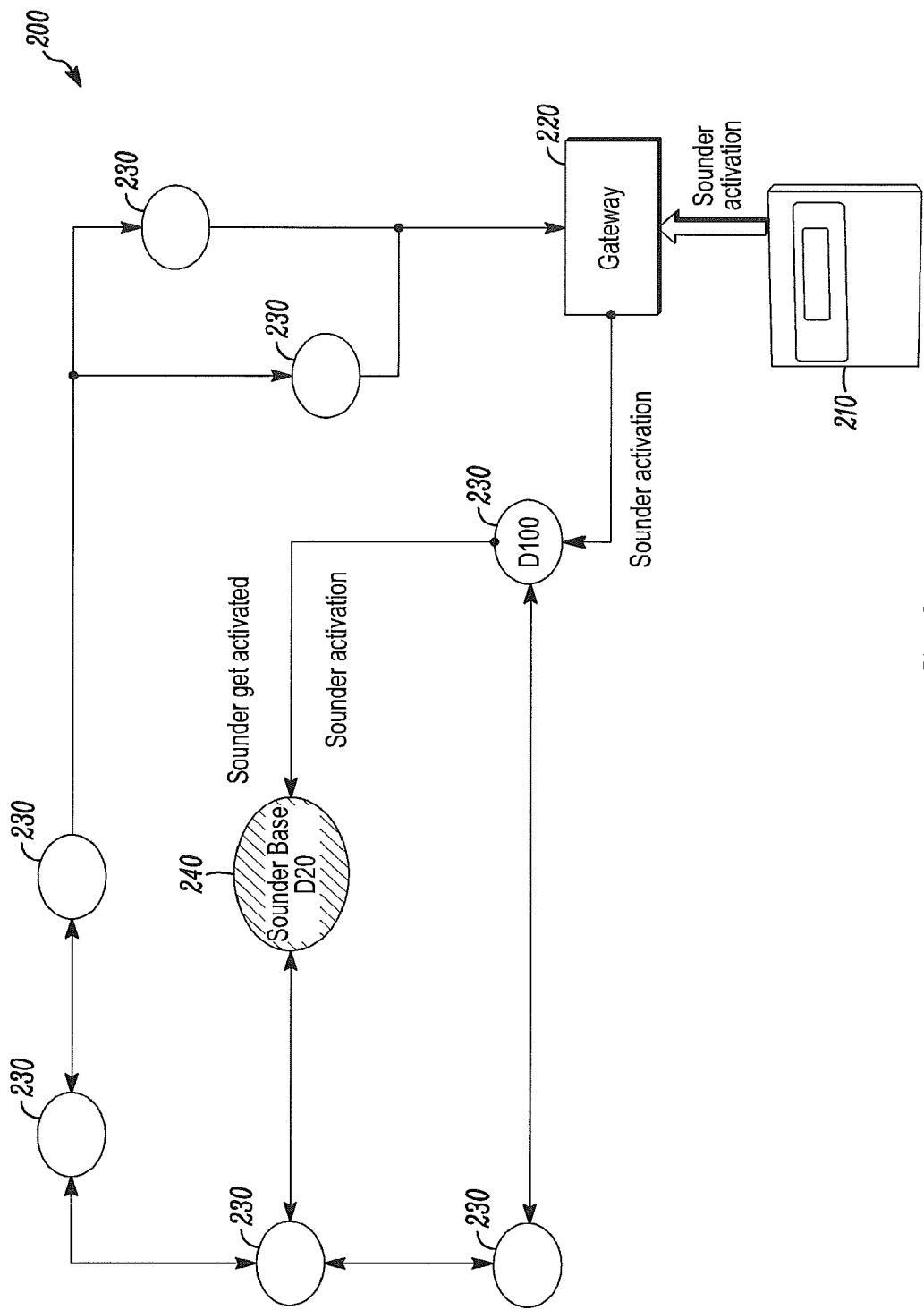
FIG. 2 is a block diagram of a system in accordance with disclosed embodiments during normal operation.
Figure 3:
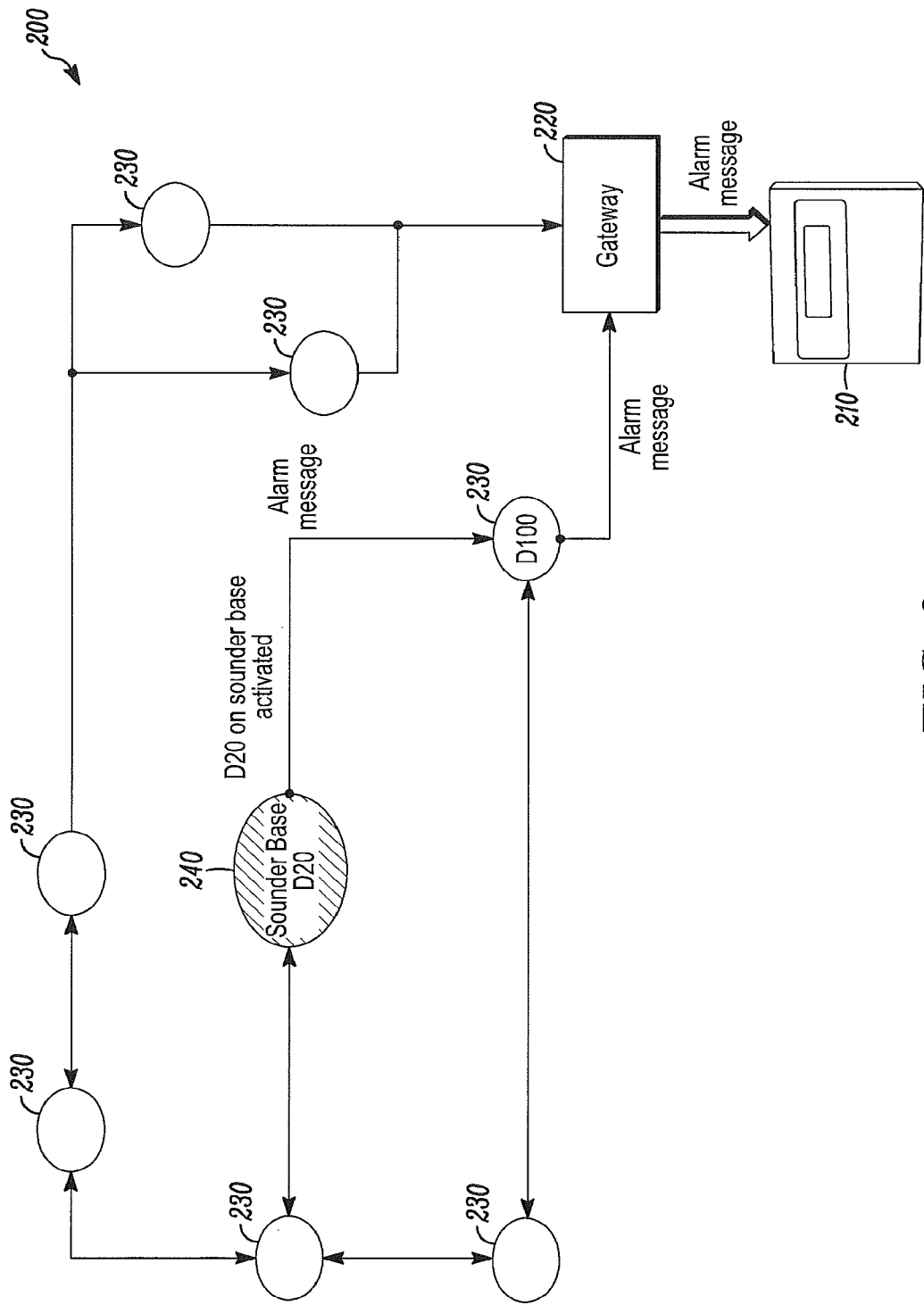
FIG. 3 is a block diagram of a system in accordance with disclosed embodiments during normal operation.

FIG. 2 and FIG. 3 are block diagrams of a system 200 in accordance with disclosed embodiments during normal operation. As seen in FIG. 2 and FIG. 3, the system 200 can include a fire system control panel 210, a gateway device 220, a plurality of mesh network devices 230, and a hybrid device 240. During normal operation and as seen in FIG. 2, the control panel 210 can transmit a signal to the gateway device 220 for activation of the hybrid device 240, and the gateway device 220 can transmit the signal to the hybrid device 240 for activation of the hybrid device 240 via one or more mesh network devices 230. Also during normal operation and as seen in FIG. 3, the hybrid device 240 can transmit a signal with an alarm message to the gateway device 220 via one or more mesh network devices 230, and the gateway device 220 can transmit the signal with the alarm message to the control panel 210.

Figure 4:
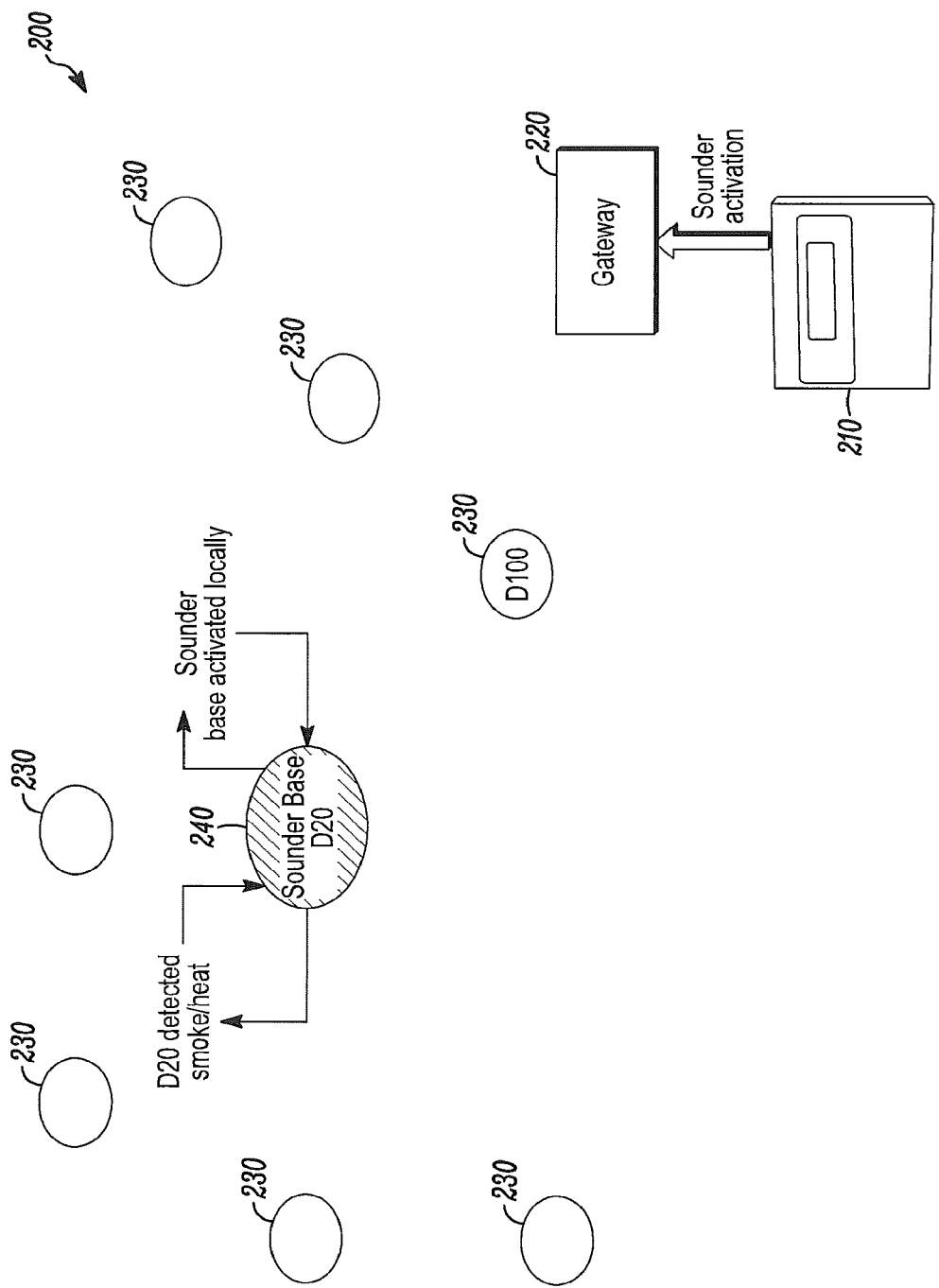
FIG. 4 is a block diagram of a system in accordance with disclosed embodiments during a self-control and self-activation mode.

FIG. 4 is a block diagram of the system 200 in accordance with disclosed embodiments during a self-control and self-activation mode. As seen in FIG. 4 and as explained above, when the hybrid device 240 detects predetermined conditions, when the hybrid device 240 determines that the system 200 or the gateway device 220 is jammed, when the hybrid device 240 determines that the gateway device 220 has failed, or when the hybrid device 240 determines that the gateway device 220 has failed and none of the mesh network devices 230 is configured to take over for the gateway device 220, the hybrid device 240 can begin operating in a self-control and self-activation mode. For example, the self-control and self-activation mode can include the hybrid device 240 controlling activation of its own output devices based on activation of its own input devices attached to the hybrid device 240, such as an input device of the hybrid device 240 detecting an ambient condition, such as, for example, heat or smoke. In some embodiments, the self-control and self-activation mode can include the hybrid device 240 dropping out of a mesh network with the mesh network devices 230.

Each of the fire system control panel 210, the gateway device 220, the mesh network devices 230, and the hybrid device 240 can include a transceiver device and a memory device, each of which can be in communication with respective control circuitry, one or more programmable processors, and executable control software as would be understood by one of ordinary skill in the art. The executable control software can be stored on a transitory or non-transitory computer readable medium, including, but not limited to, local computer memory, RAM, optical storage media, magnetic storage media, flash memory, and the like. In some embodiments, some or all of the control circuitry, the programmable processors, and the control software can execute and control at least some of the methods described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method, comprising:
providing a gateway device coupling a fire system control panel to a mesh network;
a first device in the mesh network detecting a failure of the gateway device; and
responsive to the first device detecting the failure of the gateway device, the first device self-controlling activation of one or more output devices of the first device in the mesh network;
wherein the first device is preconfigured with instructions to control the activation of the output devices in the mesh network without the gateway device.

2. The method of claim 1, further comprising the fire system control panel, via the gateway device, controlling the activation of the output devices in the mesh network prior to the failure of the gateway device.

3. The method of claim 1, further comprising the first device transmitting a signal with an alarm message to the gateway device.

4. The method of claim 3, further comprising the gateway device transmitting the signal with the alarm message to the fire system control panel.

5. The method of claim 1, wherein the failure of the gateway device includes the fire system control panel or the gateway device being jammed.

6. A method, comprising:
providing a gateway device coupling a fire system control panel to a mesh network;
a first device in the mesh network detecting a failure of the gateway device; and
responsive to the first device detecting the failure of the gateway device, the first device self-controlling activation of one or more output devices of the first device in the mesh network, wherein the first device includes a hybrid input-output device;
wherein the first device is preconfigured with instructions to control the activation of the output devices in the mesh network without the gateway device.

7. The method of claim 6, further comprising the first device dropping out of the mesh network.

8. The method of claim 6, further comprising the fire system control panel, via the gateway device, controlling the activation of the output devices in the mesh network after restoration of the gateway device.

9. The method of claim 6, wherein the gateway device synchronizes each of the output devices in the mesh network.

10. The method of claim 6, further comprising the first device controlling the activation of the output devices of a second device in the mesh network.

11. The method of claim 6, wherein the first device includes a sounder device.

12. The method of claim 11, wherein the first device activates the output devices of the first device responsive to the activation of an input device of the first device.

13. The method of claim 12, wherein the activation of the input device includes the input device detecting an ambient condition.

14. A system comprising:
a fire system control panel;
a gateway device coupled to the fire system control panel; and
a mesh network coupled to the gateway device,
wherein, responsive to the gateway device detecting a loss of communication with the fire system control panel or a failure of the fire system control panel, the gateway device controls activation of one or more output devices in the mesh network;
wherein a first device of the mesh network is preconfigured with instructions to control the activation of the output devices in the mesh network without the gateway device, and wherein, responsive to the first device in the mesh network detecting a failure of the gateway device, the first device controls the activation of the output devices in the mesh network; and
wherein the first device controls the activation of the output devices of a second device in the mesh network.

15. The system of claim 14, wherein the first device transmits a signal with an alarm message to the gateway device.

16. The system of claim 14, wherein the first device includes a hybrid input-output device.

17. The system of claim 16, wherein the first device self-controls activation of the output devices of the first device responsive to the activation of an input device of the first device.

18. The system of claim 14, further comprising the fire system control panel controlling the activation of the output devices in the mesh network prior to the loss of the communication with the fire system control panel or prior to the failure of the fire system control panel.

19. The system of claim 14, further comprising the fire system control panel controlling the activation of the output devices in the mesh network after restoration of the communication with the fire system control panel or after restoration of the fire system control panel.

* * * * *